Feb. 27, 1951     G. F. BUECHLER     2,543,276
TIRE HANDLING DEVICE
Filed March 18, 1946     2 Sheets—Sheet 1
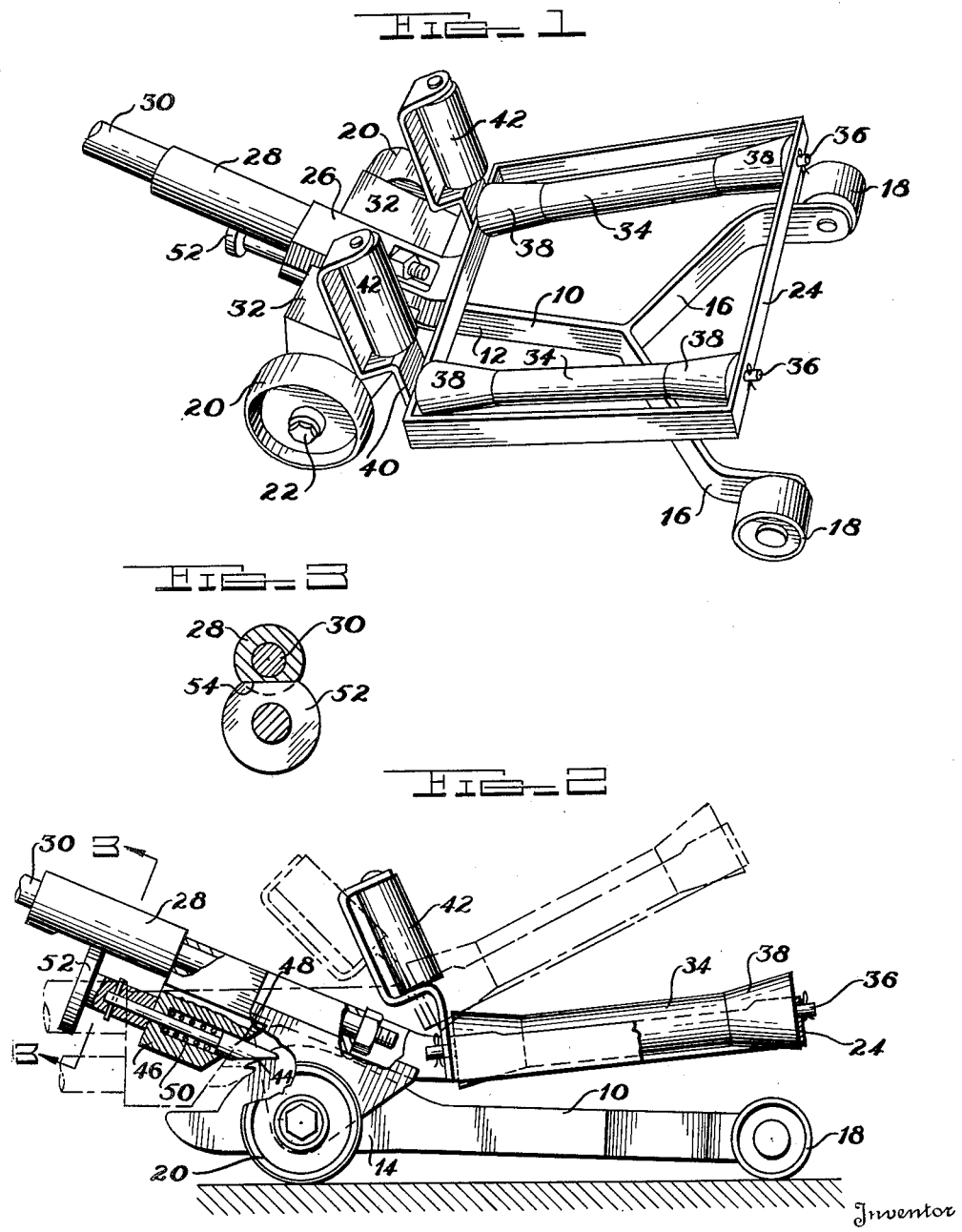
Inventor
GEORGE FRED BUECHLER
By Barnes, Kisselle, Laughlin & Raisch
Attorney

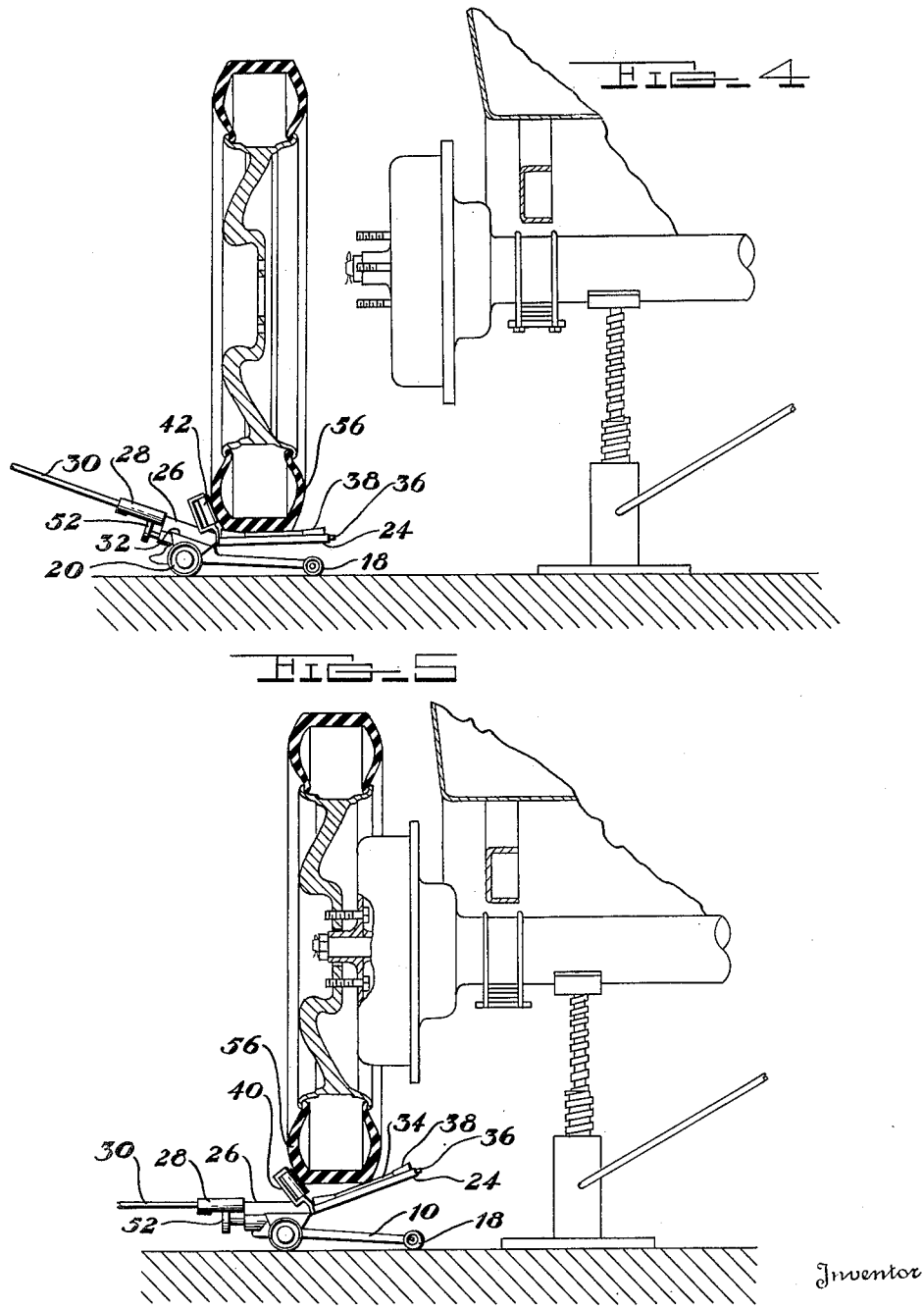

Patented Feb. 27, 1951

2,543,276

UNITED STATES PATENT OFFICE 2,543,276

TIRE HANDLING DEVICE

George Fred Buechler, Detroit, Mich.

Application March 18, 1946, Serial No. 655,300

2 Claims. (Cl. 254—8)

This invention relates to a manipulating or handling device particularly adapted for use in the operation of changing the tire and wheel on a vehicle. When the vehicle axle is supported on a jack, the axle must be raised to the point where the tire is clear of the ground and, while some little difficulty is experienced in removing the heavy tire and wheel from the axle, it is frequently quite difficult to replace the same. This is particularly true where the wheel attaching means consists of a series of bolts arranged in a circle and the wheel must be rotated to bring the holes into line with the attaching bolts at the same time that it is raised to the proper height. To thus hold a heavy tire and wheel assembly and to manipulate it into position at the same time with the bolt positions obscured by the wheel being in front of them, and while the axle itself may furthermore rotate freely whenever it is contacted by the wheel, is frequently an exasperating task.

It is an object of the present invention to provide a supporting and elevating device for a vehicle tire and wheel by which the same may be elevated into position with little effort and may, while so elevated, be rotated easily and conveniently to the proper position for alignment with the attaching bolts.

A further object is to provide a device of this character comprising a pair of frames pivotally connected together about a horizontal axis, one frame carrying ground engaging wheels and the other frame carrying tire engaging rollers together with means for rocking the second frame about its pivotal axis to elevate or lower a tire and wheel carried thereon.

In general, it is an object to provide a tire and wheel handling device of the character described which may, by simple manipulative movements requiring little effort, be used to raise the tire and wheel, to rotate it about its own axis and to traverse it longitudinally of the axle.

Figure 1 is a perspective view of a handling device incorporating a preferred form of the present invention.

Figure 2 is a side view of the device illustrated in Figure 1.

Figure 3 is a fragmentary cross section on line 3—3 of Figure 2.

Figure 4 is a diagrammatic view illustrating the device in use.

Figure 5 is a view corresponding to Figure 4 showing another position of the device in use.

Referring now to Figure 1, there is illustrated a tire and wheel handling device comprising a first frame 10 having a central bar 12 integrally formed with or secured to a bearing boss 14. A pair of bifurcated arms 16 extend from the bar 12 at its righthand end and carry a pair of small wheels 18. A second pair of wheels 20 are pivotally mounted on an axle 22 carried by the bearing boss 14.

Also pivoted on the axle 22 is a second frame 24 of rectangular form and having an integral or securely fastened boss 26 carrying a tubular socket 28 for the reception of a suitable handle lever 30. Secured to either side of the boss 26 are a pair of angular brackets 32 which pivotally engage the axle 22.

The frame 24 carries a pair of tire engaging rollers 34 mounted on axles 36. The rollers 34 preferably have oppositely facing conical end portions 38. Also secured to the frame 24 are a pair of upstanding brackets 40 which carry rotatably mounted thereon small cylindrical rollers 42. The arrangement of the rollers 34 and 42 is such that they fit with fairly close proximity the contour of a pneumatic tire to give it both vertical support and lateral support as well.

The bearing boss 14 may be provided with a segment or quadrant having ratchet teeth 44 for the purpose of retaining the frame 24 in any one of a plurality of adjusted positions. For this purpose, the boss 26 has a downwardly directed extension 46 in which is slidably mounted a detent 48. The detent is normally urged into contact with the quadrant teeth 44 by a spring 50 and may be released therefrom by operation of a pull knob 52. The latter may have a flattened portion 54 as illustrated in Figure 3 which cooperates with a flattened portion of the socket member 28 and thus serves to retain the detent 48 against rotation while permitting it to slide in and out of engagement with the teeth 44.

In operation of the device, it will be seen from Figure 4 that when a tire and wheel assembly 56 is placed on the rollers 34 and 42 and the frame 24 is positioned in its lower-most position with handle 30 upper-most, the entire device may be rolled back and forth parallel to the axle by means of the wheels 18 and 20, the small wheels 18 permitting insertion of the device with but small clearance between the tire and the ground. Thus the wheel may be brought in juxtaposition to the axle hub while its weight is supported on the handling device.

The action may consist of merely rolling the device forward or, in the event that overhanging fenders would prevent this, the top of a tire may be tilted forward to reduce its height permitting it to be inserted under the overhanging fender and then the device rolled forward bringing the tire into vertical position but slightly spaced away from the fastening bolts. The handle 30 may then be pushed downwardly by whatever amount is necessary to bring the circle of bolt holes in the wheel up to approximately the same elevation as the fastening bolts on the hub. The detent 48 will serve to retain the frame 24 and the tire in elevated position and both hands are thus free to rotate the tire about its own axis. The rollers 34 and 42 make such rotation easy and it is a simple matter to line up the bolt holes with the bolts after which the handling device, tire and wheel may then be moved inwardly to properly position the wheel on the hub. When the wheel has been made secure on the fastening bolts, the detent 48 may be released by pulling on the knob 52 and the frame 24 is lowered out of contact with the tire and the device moved out of the way.

The device can also be used in a similar manner for the purpose of removing a wheel and tire, it being obvious that by reversing the operations above described, the tire may be disengaged from the hub and lowered to the ground with great facility and without risk of damage to the threads of the fastening bolts.

While the invention has been illustrated in a preferred and modified embodiment, it will be evident that the invention may be utilized in other specific forms such as will suggest themselves to those skilled in the art and will be limited only by the terms of the appended claims.

I claim:

1. A tire handling device comprising a frame provided with a pair of wheels at the front and rear ends thereof for rolling in a direction parallel to a vehicle axle, an axle at the rear end of said frame extending transversely of the frame, said rear wheels being journaled adjacent the ends of said axle, a second frame disposed above said first frame and having downwardly extending bracket means at the rear end thereof pivoted on said axle, a hand lever rigidly associated with said second frame, roller means for engaging the tread portion of a tire mounted on the second frame and extending on the opposite side of said axle from the hand lever, said roller means being arranged on said second frame with the axis thereof extending longitudinally of said second frame, and additional roller means on said second frame extending generally upright to the plane of said second frame adapted to engage the side wall portion of a tire for preventing lateral displacement of the tire when the second frame is raised, said second roller means being positioned adjacent one end only of said first mentioned roller means whereby said frames may be removed from under the tire after the wheel is engaged on the vehicle axle by lowering the second frame and rolling the device backwardly parallel to the vehicle axle.

2. The combination set forth in claim 1 wherein said first frame is provided at the rear end thereof with a fixed hub portion supporting said axle, said hub portion being fashioned to provide a toothed quadrant thereon having tooth portions disposed circumferentially of said axle, and detent means slidably arranged on said handle for engagement with said tooth portions for selectively retaining the second frame in raised position.

GEORGE FRED BUECHLER.

REFERENCES CITED

The following references are of record in the file of this patent:

UNITED STATES PATENTS

| Number | Name | Date |
|--------|------|------|
| 843,570 | Armstrong | Feb. 12, 1907 |
| 1,099,926 | Leahy | June 16, 1914 |
| 2,205,746 | Judge | June 25, 1940 |

FOREIGN PATENTS

| Number | Country | Date |
|--------|---------|------|
| 807,603 | France | June 16, 1937 |